June 17, 1958     A. N. EMMONS     2,839,107
COMBINATION STRAIGHT AND BEVEL CUTTER
Filed March 25, 1957     2 Sheets-Sheet 1

INVENTOR.
Arthur N. Emmons
BY
Emmett Thompson
ATTORNEY.

June 17, 1958          A. N. EMMONS          2,839,107

COMBINATION STRAIGHT AND BEVEL CUTTER

Filed March 25, 1957          2 Sheets-Sheet 2

INVENTOR.
Arthur N. Emmons
BY
D. Emmett Thompson
ATTORNEY.

United States Patent Office 2,839,107
Patented June 17, 1958

2,839,107

COMBINATION STRAIGHT AND BEVEL CUTTER

Arthur N. Emmons, Nedrow, N. Y., assignor to The Porter-Cable Machine Company, Syracuse, N. Y., a corporation of New York Application March 25, 1957, Serial No. 648,172

3 Claims. (Cl. 144—218)

This invention relates to rotary cutters and is directed particularly to an integral or solid cutter capable of finishing the edge of a work piece perpendicular to the surface thereof and also finishing the edge of a work piece on the bevel.

More particularly, the invention has an object a one piece or solid cutter formed with at least one lip, or cutting edge, extending parallel to the axis of the cutter. The cutter is provided with at least one other cutting lip, or edge, extending in angular relation to the axis of the cutter. Both of the cutting edges are positioned for rotation in the same plane, or axial relationship. The intermediate portion of the angular cutting edge is positioned on the same radius from the axis of the cutter as the straight cutting edge, whereby one end portion of the angular cutting edge extends outwardly on a greater radius from the axis of the cutter than does the straight cutting edge, and the opposite end portion of the angular cutting edge is positioned on a smaller or shorter radius than the straight cutting edge.

The cutter, shown in the accompanying drawings, is intended for use particularly with a high speed wood router, and is employed especially for trimming sheet plastic material laminated to table and counter tops. The straight parallel cutting edge of the cutter is employed to trim the plastic sheet adhered to the vertical face edge of the counter or table top, and the angular cutting edge is employed to bevel the edge of the plastic sheet laminated to the top surface of the counter, or table, both of these cutting functions being performed by the same cutter without removing it from the router.

The invention consists in the novel features and in the combinations and constructions hereinafter set forth and claimed.

In describing this invention, reference is had to the accompanying drawings in which like characters designate corresponding parts in all the views.

In the drawings—

Figure 1:
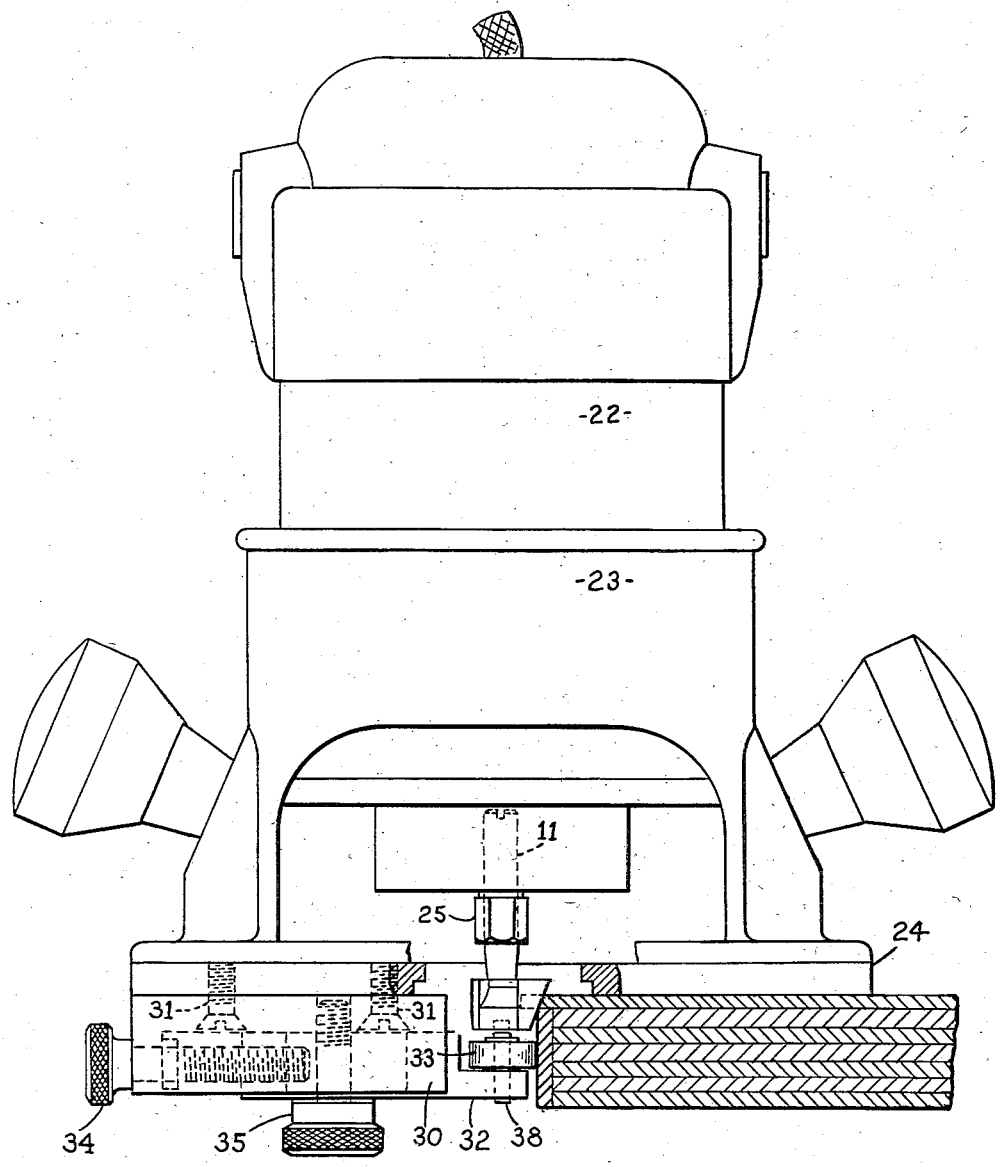
Figure 1 is a side elevational view of a router positioned on a counter top, shown in section, and illustrating the bevel trimming of the plastic sheet laminated to the counter top.

The cutter consists of a body 10 having a driving shank 11 extending axially therefrom and preferably being formed integral therewith. The lower portion of the body 10 is machined cylindrical, as indicated at 12 and, for a relatively small axial distance, the upper portion of the body is machined cylindrical, as indicated at 13. This cylindrical area 13, or that portion of it remaining after the cutter body 10 is machined, is of substantially greater diameter than the lower cylindrical portion 12. This is due to the fact that the intermediate portion 14 of the body is of conical formation.

Figures 2, 3:
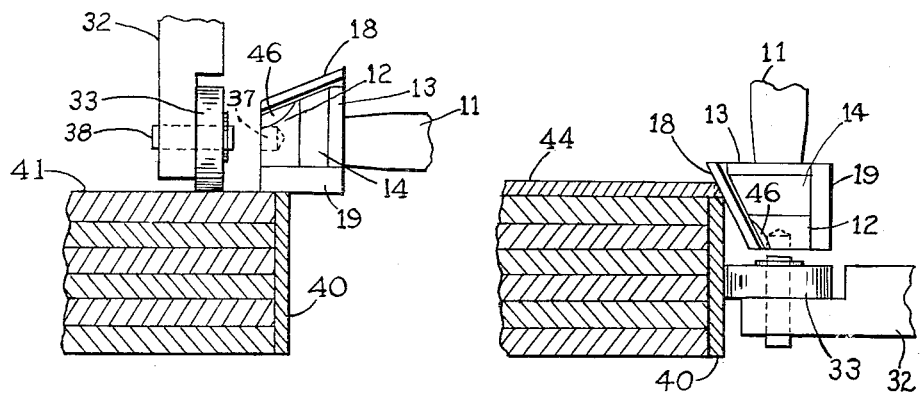
Figure 2 is an enlarged fragmentary view of a counter top with the plastic strip laminated to the front edge thereof and illustrating the position of the cutter and router guide for trimming the plastic sheet flush with the counter top.
Figure 3 is an enlarged fragmentary view illustrating the arrangement of the cutter and guide for beveling the edge of the top plastic sheet.

Opposite sides of the body are partially machined off flat throughout the axial length of the body to provide cordal surfaces 15, 16. These surfaces 15, 16, terminate at chordal shoulders extending perpendicular to the surfaces 15, 16, and against which plates 18, 19, are fixed. These plates 18, 19, are formed of hard, long wearing, cutting material, such as tungsten carbide, and their outer edges are beveled for cutting relief, as is conventional. The cutting edge of the plate 19 extends parallel to the axis of the cutter, as shown in Figures 1, 2 and 3. The plate 18 is of substantially triangular formation, see Figure 4, whereby the cutting edge thereof inclines upwardly and outwardly in angular relation to the axis of the cutter, also illustrated in Figures 1, 2 and 3. The cutting lip 18 is so positioned that the intermediate portion of its cutting edge is located, on a radius from the axis of the cutter, so as to position it radially comparable to the cutting edge of the plate 19, as indicated by the dotted line 20, Figure 4.

With this arrangement, the lower end portion of the cutting lip 18 is spaced inwardly, or on a shorter radius than the straight cutting lip 19, and by the angular relation of the cutting edge of the plate 18, the upper portion thereof is positioned a greater distance outwardly from the axis of the cutter than is the straight cutting lip 19. It is advantageous in having the angular cutting lip 18 extend below the medial line 20. This overlapping of the cutting lips avoids leaving any uncut portion, or fin, between the straight and bevel cuts on the work piece.

The cutter is used is a machine wherein a uniform spacing is maintained between the axis of the cutter and the work piece. In the drawings, the cutter is illustrated as used with a portable hand manipulated router which is provided with suitable guide means. In Figure 1, 22 designates the motor housing of a conventional router, the housing being mounted in the base 23 for axial adjustment toward and from the base plate 24. 25 designates the closing nut of a chuck or collet by which the shank 11 of the cutter is gripped for high speed rotation. A guide body 30 is fixed to the base plate 24, as by screws 31, and a guide carrying member 32 is slidably mounted in the guide body 30 and carries at its inner end a guide roll 33. Preferably, the guide roll 33 in the form shown has a radius substantially equal to the radius of the straight cutting lip 19 from the axis of the cutter, and the guide roll is initially adjusted in coaxial relation with the cutter, as hereinafter set forth. In the arrangement shown in Figure 1, the guide carrying member 32 is adjusted radially of the machine in the body 30 by an adjusting screw 34, and the guide member 32 is clamped in adjusted position by a clamp screw 35. The lower or bottom end of the cutter is formed with a hole 37. The guide roll 33 is journalled in the guide member 32 on a pin 38. The guide member 32 is adjusted to bring the pin 38 in axial registration with the cutter, or the hole 37 at the lower end thereof.

When the router motor 22 is moved upwardly to position the lower portion of the cutter in registration with a work piece on which the base plate 24 is mounted, such as the facing strip 40, Figure 2, the lower portion of the cutting lip 19 will engage the strip and machine it off flush with the counter top 41, on which the guide roller 33 is positioned. When the router motor is adjusted downwardly to move the cutter downwardly, relative to the base plate 24 with the lower end of the cutter in proximity to the guide member 32, the upper portion of the cutting lip 18 engages the work piece to effect a bevel cut on the counter top 44, Figure 3. Thus, the one cutter serves to trim or cut a workpiece normal to the surface on which the router is positioned and the cutting lip 18 serves to bevel the edge of the work piece on which the router is manipulated.

Figures 4, 5, 6:
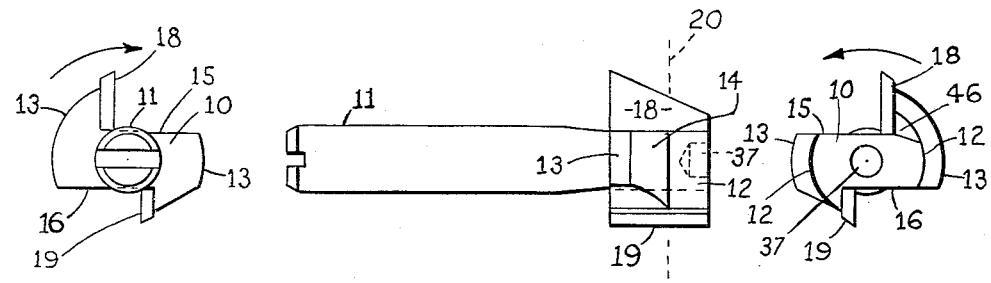
Figure 4 is an enlarged side elevational view of the cutter.
Figure 5 is a view, looking to the right, Figure 4.
Figure 6 is a bottom plan view of the cutter looking to the left, Figure 4.

The reason for the lower cylindrical portion 12 of the body is to form a suitable backing for the lower end portion of the straight cutting lip 19, this cylindrical portion being relieved, as at 46, Figures 2, 3, and 6, during the grinding of the cutting edge of the angular lip 18.

The cutter described is economical to manufacture and, by axial adjustment relative to the work piece, serves as both a straight and angular cutter.

What I claim is:

1. A rotary cutter formed with a first straight cutting edge extending parallel to the axis of the cutter, said cutter being formed with a second straight cutting edge extending in angular relation to the axis of the cutter, both of said cutting edges being positioned for rotation in the same axial relationship, the central portion of said second angular cutting edge being spaced from the axis of the cutter on the same radius as said first straight cutting edge.

2. A rotary cutter formed with a first straight cutting edge extending parallel to the axis of the cutter, said cutter being formed with a second straight cutting edge extending in angular relation to the axis of the cutter, both of said cutting edges being positioned for rotation in the same axial relationship, one end portion of said second angular cutting edge being spaced from the axis of the cutter a greater distance than the spacing of said first straight cutting edge, the opposite end portion of said second angular cutting edge being spaced from the axis of the cutter a lesser distance than said first straight cutting edge.

3. A rotary cutter formed with a first straight cutting edge extending parallel to the axis of the cutter, said cutter being formed with a second straight cutting edge extending in angular relation to the axis of the cutter, the intermediate portion of said second cutting edge being spaced from the axis of the cutter on the same radius as first cutting edge.

References Cited in the file of this patent

UNITED STATES PATENTS

| | | |
|---|---|---|
| 749,458 | Spencer | Jan. 12, 1904 |
| 1,032,891 | Gibeson | July 16, 1912 |
| 2,756,785 | Godfrey | July 31, 1956 |